April 24, 1934.    L. E. JONES    1,955,749
BRUSHING MACHINE
Original Filed June 1, 1929

Lloyd E. Jones.
INVENTOR.

Patented Apr. 24, 1934

1,955,749

UNITED STATES PATENT OFFICE 1,955,749

BRUSHING MACHINE

Lloyd E. Jones, Pasadena, Calif., assignor to Food Machinery Corporation, San Jose, Calif., a corporation of Delaware Application June 1, 1929, Serial No. 367,667
Renewed May 29, 1933

9 Claims. (Cl. 146—202)

My invention relates to machines for washing, brushing, polishing and similar operations upon the surfaces of spherical or irregularly shaped articles, and, without intent to limit the scope of application of my invention, the ensuing disclosure, by way of example, is directed more particularly to washing fruit.

The invention has for its principal object to provide an automatic machine for progressively feeding such articles and subjecting them to continued and efficient brushing action.

Another object of the invention is to provide a machine in which articles such as oranges, for example, may be first washed under water to remove accumulation, then subsequently scrubbed by brushes under water, and then finally subjected to suitable brushing action above water.

Another object of the invention is to provide an improved arrangement of brushes for machines of the class described.

Numerous other objects and advantages of my invention will either be pointed out hereinafter or will appear to those skilled in the art of constructing and using such machines.

One of the salient features of my invention is the provision of an arrangement of circular rotary brushes arranged to rotate on parallel axes with their brushing perimeters in substantially meeting relation. Such arrangement provides between each pair of brushes a transverse groove of such dimensions as to normally retain fruit which finds its way therein. A plurality of brushes so arranged provides a large horizontal surface capable of holding a large quantity of fruit, all of which fruit are continually subjected to the action of the brushes. The brushes preferably are arranged to rotate each in the same direction as the others so that while the tendency of the brushes is to feed the fruit forwardly such fruit normally remains in a groove and is subjected to the action of the brushes until some slight exterior force is added to the forward urge of the brushes to move the fruit forwardly.

In conformance with another salient feature of the invention the brushes are set in a receptacle or tank in which a water level is maintained to such a point that the brushes will dip slightly in the water; the upper surfaces of the brushes being above the water level. In subjecting fruit to the action of the brushes such fruit is conveyed slowly under the revolving brushes whereby the buoyancy of the fruit results in same being held lightly against the submerged surfaces of the brushes so that the fruit is actually scrubbed under water.

Conveying means are provided for moving the fruit in submergence under the brushes and for subsequently conveying the fruit to the top side of the brush arrangement; whereupon the fruit is conveyed slowly over the top brushes in such manner as to become thoroughly brushed above water by the moist brushes. The same conveying means is also arranged to carry the fruit under water a suitable distance before bringing it to the action of the brushes; whereby foreign accumulations on the fruit are softened or partially removed before the fruit reaches the brushes. The conveying means is also designed to properly convey the fruit without setting up fluid currents which would tend to move the fruit too rapidly and prevent proper brushing action.

In conformity with still another feature of the invention the brushes are provided peripherally with a spiral groove, the groove of alternate brushes being left-hand and the grooves of the other brushes being right-hand to provide an improved brushing action which will be more particularly pointed out hereinafter.

I have illustrated by the accompanying drawing one practical embodiment of my invention in the form of an orange washing machine.

Figure 1:
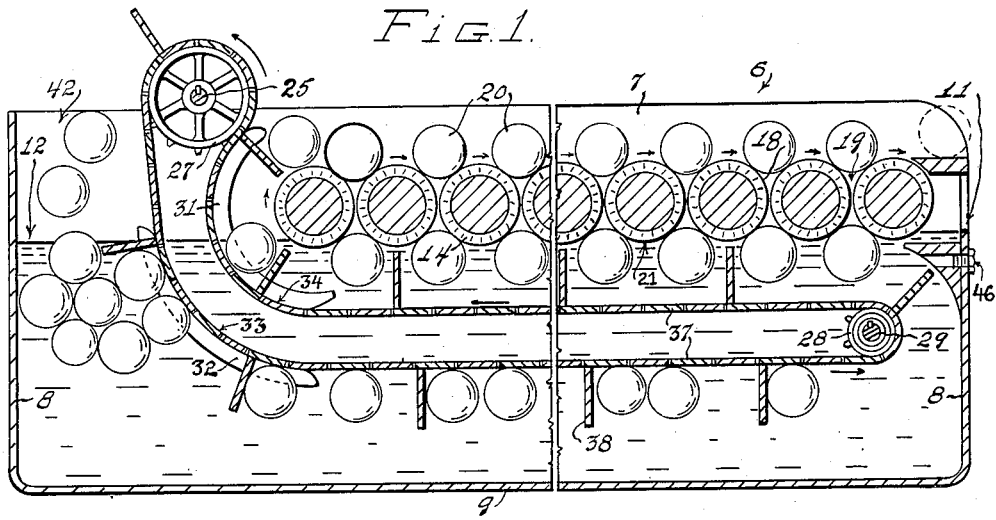
Figure 1 is a longitudinal sectional view of such embodiment.
Figure 2:
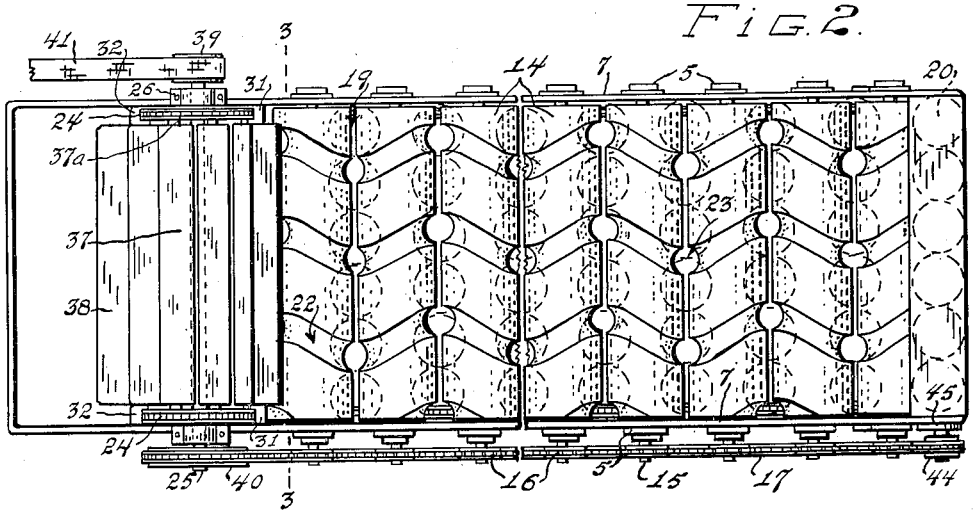
Figure 2 is a plan view thereof, showing parts broken or removed to reveal underlying parts.

Referring to the accompanying drawing and the reference numerals appearing thereon, 6 indicates a tank having side walls 7, 7, end walls 8, 8 and a curved bottom wall 9. The bottom wall is provided with a suitable large drain opening 10, while one end wall is provided with an overflow spout 11 whereby the tank may be filled only to a given level such as indicated at 12.

The brushes 14 are arranged transversely of the tank; each brush being fixed to a corresponding brush shaft 15 which extends out at each end through the corresponding side wall; one end of each shaft being provided with a sprocket wheel 16. An endless sprocket chain 17 connects all sprocket wheels 16 so that all brushes revolve synchronously in the same direction of rotation. The brushes are arranged parallel to each other so that the bristles or brushing perimeters 18 are in substantially meeting relation to the perimeters of adjacent brushes. The entire series of transverse brushes provide a co-extensive top surface extending longitudinally of the machine, capable of holding large quantities of fruit. Between each pair of adjacent brushes there exists a transverse groove 19 by reason of the circular cross section of the brushes. Fruit such as 20 tends to remain in these grooves. The brushes also provide a co-extensive lower brushing surface 21, arranged to come slightly below the fluid level so that the brushes are at all times moistened and such fruit as may be under the brushes is subject to brushing action while being submerged.

The aforesaid spiral grooves in the brushes are shown at 22, the groove of one brush being right-hand and the groove of the next brush being left-hand. For each convolution of the grooves there is a point such as 23 between each two adjacent brushes where the grooves pass and form a slightly deeper depression.

The conveyor or feeder means includes a pair of sprocket chains 24 driven by a main drive shaft 25 running in spaced bearings 26 mounted on the side walls of the tank. Adjacent each end the shaft 25 is provided with sprocket wheels 27 within the tank; one wheel for each chain 24. Each chain runs over a sprocket 28 carried by an idler shaft 29 mounted transversely of the tank near the end opposed to that near which the main drive shaft is situated. The idler shaft is located below the fluid level and is mounted in suitably packed outboard bearings 30 carried by the side walls of the tank. The idler shaft is disposed below the last brush.

Both above and below each of the feeder chains 24, guides 31, 31 and 32, 32 respectively are disposed; these guides being arranged to predetermine the path through which the feeder chains shall move. Such path is from the driven sprocket downwardly to points below the fluid level, there curving gently as at 33 and continuing horizontally forwardly to the idler shaft, thence returning horizontally under the series of brushes in parallel relation thereto and then curving again as at 34 upwardly to the main drive sprocket. Considering these guides in cross section their lower surfaces 36 are sloped inwardly and upwardly so that the buoyancy of the fruit will prevent the fruit from lodging thereunder.

The conveying means now being described, further includes transverse slats 37 carried by the chains so as to form a suitable partition to hold fruit submerged underneath the conveying means and to preclude its floating up into contact with the brushes until after it has been carried in the manner desired by the conveying means. From certain of these slats, at suitably spaced intervals, feeder boards 38 project; these feeder boards being secured to the corresponding slats at right angles. The drive shaft of the conveying means is provided with a pulley 38 whereby the entire machine may be power driven and on the main drive shaft a sprocket 39 connects with a sprocket 40 on one of the brush shafts, by means of a chain 41, whereby the brushes are driven co-ordinately with the conveying or feeding means.

Considering the operation of the machine in washing fruit; the brushes revolve so that their upper surfaces are moving forwardly of the machine and the conveyor moves so that the lowermost feeder boards are moving forwardly of the machine; the direction of the moving parts being indicated by the several arrows appearing on the drawing. It will be noted that the feeder boards when at or near the drive sprocket are out of the water, and that the rear end of the tank is open suitably as at 42 to receive fruit in quantities. Such fruit may either be dumped into the rear end of the tank to float there as shown, or, suitably well known feeding means may be employed to continually introduce fruit under the then descending feeder board at the rear of the machine.

As each successive feeder board passes over the sprocket and then descends into the water, some fruit is caught under the board and is carried down under the water. As that feeder board moves slowly forward the fruit is soaked by the continued submergence and accumulations are softened or partially removed; being free to gravitate to the bottom of the tank. The action of the feeder is slow and it acts as a barrier between the brushes to prevent fluid agitation and currents and so that heavy particles of foreign substance are free to settle to the bottom of the tank. As the feeder boards progress the fruit is carried to the front of the machine and the feeder boards after passing over the idler shaft allow the fruit to float up under the brushes into contact therewith.

Now the buoyancy of the fruit results in such fruit being held gently and suitably against the submerged brushes. The brushes impart a spinning action to the submerged fruit. This spinning action continually exposes new surfaces of the fruit to the brushes and in addition to such brushing action, washing of the fruit is further assured by reason of the fruit being continually revolved under water. The feeder boards cause the fruit to move from one brush to the other and in so acting upon fruit cause same to continually change their axes of rotation. It will also be understood that the fruit tends to form itself into transverse rows and thus each orange is sometimes in contact with another orange, or again is in contact with a feeder board, and at practically all times is in contact with a brushing surface. The right-hand and left-hand grooves in the brushes co-act to set up eddies in the water adjacent thereto to further insure constant action on the part of the fruit.

By the time a feeder board has again reached a position near the rear-most brush, the fruit has been well soaked and washed under water. It should be explained at this point that in the case of oranges and certain other fruit warm soapy water is employed in the tank; suitable heating, circulating and soap feeding devices (not shown) being employed. When a feeder board reaches the main drive sprocket it becomes inclined downwardly-forwardly so that fruit thereon will gravitate to the top of the brushes. In the use of warm soapy water the upper surfaces of the brushes are naturally covered with a cleansing lather and are sufficiently moist to give the fruit a final cleansing.

As the fruit rolls from each feeder board it enters the groove between the first and second roller respectively. Here the fruit is rotated or tumbled about continually but gently and in contact at all times with the two brushes. Were the brushes devoid of the spiral groove there would be a tendency for each fruit, particularly in the case of well shaped oranges, to spin continually on one axis so that it would not have all surfaces exposed to the brushes. The spiral groove of one brush however tends to cause fruit to move laterally in one direction while the opposing groove tends to move the fruit in an opposite direction. The net result is that all of the various forces and tendencies set up by the brushes cause the fruit to be continually rolled and tumbled upon the top brush surfaces in a very efficient manner. As oranges roll into the first groove the groove finally becomes filled laterally but none of these oranges can escape from the groove when the rotative speed of the brushes is normal. However, it is a peculiarity of my improved machine and brush arrangement that the addition of a single fruit to a filled groove will result in that added single fruit displacing another fruit from the first groove to the second groove, the added fruit meanwhile taking up its position in the first groove. While this phenomenon is not at first apparent, it should be explained that while a fruit is being turned between two brushes it has insufficient traction against a brush to be carried thereby from one brush to another, but when a second orange tries to crowd its way into the same groove it offers traction for the first orange and the result is as explained. By reason of this phenomenon all fruit fed to the machine eventually reaches the upper brushing surface and fills each groove successively until the entire series of grooves are filled both laterally and longitudinally of the machine, as shown in the plan view. All such fruit will also remain on the upper brushing surface of the machine until an added fruit rolls from a feeder board into the already filled first groove. This fruit displaces one fruit from the first groove to the second groove, resulting in another fruit being displaced from the second groove to the third groove, and so on in rapid order until finally one fruit has been displaced from the last groove over the apron 45 and out of the machine.

It will be apparent now that this machine retains and brushes all fruit fed to it until it is filled to capacity, whereupon it begins to deliver washed fruit at precisely the same rate and order at which new fruit is fed to the top of the brushes.

To change the operation of machine to suit various requirements, many modified methods of operation will suggest themselves to the minds of those skilled in the art. As an example: The plug 46 may be removed to slightly lower the water lever so that fruit under the brushes may be soaked as desired, without the brushes coming into contact with water at any time. Then when the fruit is transferred by the feeder boards to the top brushing surfaces, the dry brushes will act as polishers and driers only.

Figure 3:
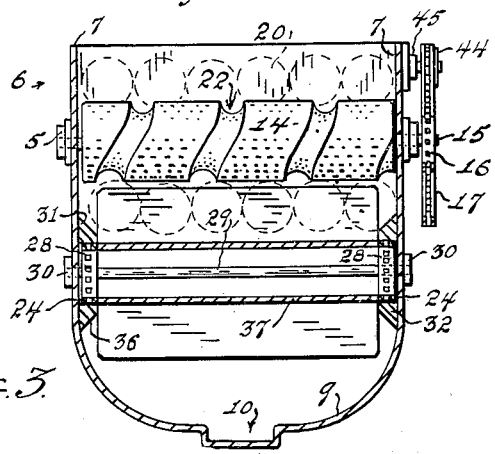
Figure 3 is a view in cross section thereof on a line 3—3 of Figure 2.

As heretofore explained, fruit is removed from the brushes ordinarily only by the addition of more fruit. If, however, after no more fruit is to be fed to the machine, it is desired to clear the machine of all fruit, a board may be held in the broken line position shown in Figure 3, and moved forwardly of the machine close to the brushes. This board adds to the otherwise ineffective fruit-moving tendency of the brushes and results in the machine being cleared of all fruit.

During the ensuing specification applicant has called the space defined by adjacent brush rolls, "grooves". He wishes to mention that they may be synonymously called, valleys, paths, lanes, furrows, channels etc. and that the use of any such terms will be understood as meaning the same thing as applied to his invention.

Considerable mention has been made as to the feeding effect of fruit through applicant's machine after it has been deposited on the tops of the brushes, and applicant wishes to bring out the fact that the top surfaces of the brushes may be used independent of the lower surfaces, for first washing the fruit. If fruit is delivered directly to the first valley of the tops of the brushes and without any previous washing or scrubbing in the same machine the action on the fruit will be identical as when passed through applicant's entire machine as shown in the drawing, and that further, the brushes may be operated without any contact with a cleansing liquid in which case they would function as polishing or cleaning brushes.

After applicant's machine has been started and a stream of fruit is fed to the machine the first lot of fruit will fill the first valley and the fruit will be turned and brushed. A continued feeding of fruit will contact with fruit already in the valley, will retard its spinning or turning action and thereby slightly increase the tractive effect of the fruit on the brushes, surfaces and as many fruit will roll from the first valley over into the second valley as have been presented to the first runway and if the feed is continuous there will be a continuous advance of fruit from valley to valley in volume equal to the volume entering the first valley. This feature is a very valuable part of applicant's invention inasmuch as he can control the volume flow of fruit through the machine entirely by the volume of fruit fed to the machine.

If it happens that a batch of oranges is running comparatively clean the volume fed to the machine may be increased and the output of the machine increased in like volume, thereby shortening the brushing time. If a batch of oranges happens to be running comparatively dirty and with more or less of debris adhering thereto, he can decrease the volume flow entering the machine and thereby decrease the volume flow output in like amount, and thereby increase the brushing time to thoroughly remove the extra debris. This variable manner of control is possible without in any manner changing the speed of the brush rollers or without any adjustment of any kind to any part of the machine, it is accomplished entirely by the volume fed to the machine and may be varied at any time to suit any varying changes in conditions of the fruit or demands from the loaders, or packers. If one single fruit per minute is fed to the first valley, when all the valleys are filled, that fruit will cause a displacement of a single fruit from each succeeding valley in quick succession until a single fruit is delivered from the machine, likewise if one thousand fruits per minute are fed to the first valley per minute, when all the valleys are filled, there will be an instant displacement of one thousand fruits from each valley until a thousand fruits are delivered from the machine. Machines that are normally built to deliver four car loads of fruit per day, feeding the fruit at the proper volume rate, may be increased in speed to deliver eight car loads per day by simply increasing the volume flow to the machine, and likewise can be reduced to deliver only two cars per day by simply decreasing the volume flow of fruit to the machine, the speed of the brush rolls being constant in any case. This is assuming of course, that an increase in volume flow for increased delivery will give sufficient brushing time to properly clean the fruit.

The reason for retaining the fruit in a valley until displaced by an additional fruit is on account of the tractive effect between the fruit and the brushing surfaces. The rotation of the brushes combined with the reverse spiral surfaces tends to spin and rotate the fruit and thus normally retard the tractive effect. The contact of oncoming fruit has the effect of temporarily stopping the spinning action which immediately permits an increase in tractive effect and the fruit is carried over the brush into the next valley.

Stating it another way, there is a balanced equilibrium established between the brush surfaces and the fruit after a valley is filled, that gives sufficient tractive effect to turn and spin the fruit for cleaning purposes but insufficient to carry the fruit from valley to valley and it requires some outside force to contact with the fruit in the valley, another fruit, an operator's hand or a piece of board or the like, anything that will retard the spinning and turning of the fruit will immediately increase the tractive effect and cause the fruit to follow the roll and land in the next valley.

While I have shown and described a specific embodiment of my invention and have disclosed only two specific methods for using the machine, it is understood of course that various methods of use and various designs and constructions and arrangements of parts may be employed without departing from the spirit of the invention.

I claim:

1. In a machine of the class described a tank adapted to hold fluid to a given level, a plurality of closely spaced parallel rotary brushes jointly providing a lower co-extensive brushing surface parallel to and adjacent to such level and an upper co-extensive article-carrying surface, and means for moving buoyant articles normally to the axes of rotation of said brushes in floating contact with such lower surface; said means operable to subsequently transfer such articles to said upper article-carrying surface.

2. In a machine of the class described a tank adapted to hold fluid to a given level, a plurality of closely spaced parallel rotary brushes jointly providing a lower co-extensive brushing surface parallel to and adjacent to such level, said brushes all rotating in the same direction, and means for moving buoyant articles under such surface and in floating contact therewith at a uniform rate of speed; said means comprising moving boards transverse to their direction of travel to prevent formation of adverse fluid currents.

3. In a machine of the class described an elongated tank adapted to contain fluid to a given level, a plurality of parallel rotary brushes arranged with their axes of rotation transversely of said tank immediately above such level, said brushes providing both a co-extensive horizontal under-surface and a co-extensive upper article conveying surface, an endless conveyor running longitudinally in said tank, feeder members carried by said conveyor and extending transversely of said tank; said conveyor arranged to move said feeder members from above said fluid level at one end of said tank downwardly under said fluid level, thence forwardly under such level to adjacent the opposite end of the tank, thence upwardly to adjacent said under surface, thence parallel thereto to the first named end of the tank and thence upwardly to a position to feed articles on to said upper article-carrying surface; said tank including parallel side walls co-acting with said upper surface to provide a run-way.

4. In a machine of the class described an elongated tank adapted to contain fluid to a given level, a plurality of parallel rotary brushes arranged with their axes of rotation transversely of said tank immediately above such level, said brushes providing both a co-extensive horizontal under-surface and a co-extensive upper article conveying-surface, an endless conveyor running longitudinally in said tank, feeder members carried by said conveyor and extending transversely of said tank; said conveyor arranged to move said feeder members from above said fluid level at one end of said tank downwardly under said fluid level, thence forwardly under such level to adjacent the opposite end of the tank, thence upwardly to adjacent said under surface, thence parallel thereto to the first named end of the tank and thence upwardly to a position to feed articles on to said upper article-carrying surface; said tank including parallel side walls co-acting with said upper surface to provide a run-way, and means for moving said conveyor and rotating said brushes co-ordinately in the same direction whereby articles traverse said surfaces in a direction corresponding to peripheral movement of said brushes at corresponding surfaces.

5. An apparatus for treating fruit or the like comprising a series of rotatable brushes mounted to form a substantially horizontal supporting surface, the brushes being positioned to form a plurality of storage and treating troughs, a tank to provide a cleansing liquid into which the said brushes are partially immersed, means in combination with said brushes for causing a circulation in said liquid which carries buoyant fruit forward and in contact with the under sides of the brushes, the said means moving the fruit and delivering it to the treating troughs formed by the upper surfaces of the brushes, the movement of the fruit across the said upper surface from trough to trough being determined entirely by the quantity of fruit delivered to the first trough.

6. An apparatus for cleaning fruit or the like comprising a plurality of parallel arranged brushing elements positioned to form supporting valleys, means for imparting rotation to said brushes, means for holding said brush elements in fixed locations, transversely movable endless conveyor means for positively moving fruit transversely of said brushing elements then delivering said fruit to the supporting valleys of the upper portions of said brushing elements for further treatment.

7. In a machine of the class described, a tank, a rotary brushing surface disposed in said tank and means for rotating said surface, means for maintaining fluid in the tank to a level contacting with the lower portion of said brushing surface whereby fruit floating in said liquid may be buoyantly held in contact therewith, with endless conveying means for moving fruit transversely of said brushing surface.

8. In a machine of the class described, a tank adapted to contain fluid, means for moving buoyant articles longitudinally in said tank, rotary brushes disposed above said fluid and transversely to said moving means to contact with such moving articles and means comprising dividing members moving transversely through said fluid to move said articles at a predetermined rate irrespective of fluid currents and to provide a free fluid space below the surfaces of said brushes for unretarded ducking of said articles by said brushes.

9. In a machine of the class described, a tank, a rotary brushing surface disposed in said tank and means for rotating said surface, means for maintaining fluid in the tank to a level contacting with the lowermost portion of said brushing surface whereby fruit floating in said fluid may be buoyantly held in contact therewith, with endless conveyor means beneath the brushing surface for moving fruit transversely of said brushes and a free fluid space below the surfaces of the brushes for unretarded ducking of the fruit in the liquid by the rotation of said brushing surface.

LLOYD E. JONES.